(12) United States Patent
Lebovitz et al.

(10) Patent No.: US 7,587,591 B2
(45) Date of Patent: Sep. 8, 2009

(54) SECURE TRANSPORT OF MULTICAST TRAFFIC

(75) Inventors: Gregory M. Lebovitz, San Jose, CA (US); Changming Liu, Cupertino, CA (US); Choung-Yaw Shieh, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 932 days.

(21) Appl. No.: 10/976,026

(22) Filed: Oct. 29, 2004

(65) Prior Publication Data

US 2005/0138369 A1 Jun. 23, 2005

Related U.S. Application Data

(60) Provisional application No. 60/516,346, filed on Oct. 31, 2003.

(51) Int. Cl.
H04L 29/06 (2006.01)
(52) U.S. Cl. .................. 713/163; 713/153; 713/160; 380/34; 709/240; 709/224; 370/412; 370/366
(58) Field of Classification Search .......... 713/163, 713/153, 160, 162; 380/34; 709/240; 370/366, 370/239
See application file for complete search history.

(56) References Cited

U.S. PATENT DOCUMENTS 6,606,706 B1 8/2003 Li
7,127,610 B1* 10/2006 Li et al. ............... 713/163
7,181,014 B1* 2/2007 Srivastava ............ 380/278
7,360,084 B1* 4/2008 Hardjono ............. 713/163
2003/0037235 A1 2/2003 Aziz et al.

OTHER PUBLICATIONS

Baugher, Mark et al., "Internet Draft: Group Key Management Architecture", Feb. 28, 2002. www.securemulticast.org/draft-ietf-msec-gkmarch-03.txt, XP-002322093, 27 pages.
International Search Report for PCT/US2004/035735 mailed Apr. 6, 2005.
IPSec Working Group Memo by S. Kent: "IP Encapsulating Security Payload (ESP)," Sep. 2004, 43 pages.
Network Working Group Memo by S. Kent et al.: "Security Architecture for the Internet Protocol," Nov. 1998, 29 pages.

* cited by examiner

*Primary Examiner*—Kimyen Vu
*Assistant Examiner*—April Y Shan
(74) *Attorney, Agent, or Firm*—Harrity & Harrity, LLP

(57) ABSTRACT

Secure tunneled multicast transmission and reception through a network is provided. A join request may be received from a second tunnel endpoint, the join request indicating a multicast group to be joined. Group keys may be transmitted to the second tunnel endpoint, where the group keys are based at least on the multicast group. A packet received at the first tunnel endpoint may be cryptographically processed to generate an encapsulated payload. A header may be appended to the encapsulated payload to form an encapsulated packet, wherein the header includes information associated with the second tunnel endpoint. A tunnel may be established between the first tunnel endpoint and the second tunnel endpoint based on the appended header. The encapsulated packet may be transmitted through the tunnel to the second tunnel endpoint. The second tunnel endpoint may receive the encapsulated packet. Cryptographic processing of the encapsulated packet may reveal the packet having a second header. The packet may then be forwarded on an interface toward at least one multicast recipient identified in the second header.

21 Claims, 9 Drawing Sheets

--PRIOR ART--

--PRIOR ART--

SECURE TRANSPORT OF MULTICAST TRAFFIC

CROSS-REFERENCE TO RELATED APPLICATION

This application claims the benefit of U.S. Provisional Patent Application No. 60/516,346, filed Oct. 31, 2003, the contents of which are incorporated by reference herein.

BACKGROUND OF THE INVENTION

A. Field of the Invention

Systems and methods consistent with the principles of the invention relate generally to methods and apparatuses for secure network communications.

B. Description of Related Art

Network computing applications involving groups of computers may send the same information to multiple computers in the group. There are three conventional ways to design a network application for group communication: unicast, broadcast, and multicast. As shown in FIG. 1, unicast systems allow the transmission of a copy of each data packet to one specific recipient. In order to transmit to multiple recipients, a separate connection is made with each recipient. Making multiple direct connections requires a large amount of bandwidth as the number of recipients increases and can result in delays since the same packet must be repeatedly copied and then transmitted to each recipient. Under a broadcast system, one copy of each packet may be sent to a broadcast address. As a result, the broadcast transmission may be sent to a large number of people when only a small number actually wish to receive the broadcast.

With a multicast system, a network application may send one copy of a packet(s) addressed to a group of recipients instead of just sending the packet(s) to one recipient, as in unicast systems. One or more networks may then forward the packet(s) to the recipients. Because of the dependence on the network to forward the packet(s), multicast applications may only work on networks that are multicast enabled. Generally, transmissions such as unicast, broadcast, or multicast are not secure because the destination address may be visible to anyone on the network, even if the data payload of the packet has been encrypted.

There are several conventional methods to transmit data packets through a network. Some of these conventional methods may provide secure transmissions, while others may not. One technique for secure transmission of data packets is the use of a unicast tunnel. As shown in FIG. 2, a source device 210 may transmit data to a tunnel gateway 220 for transmission across a unicast tunnel 230 in order to reach a destination device 270 through a tunnel endpoint 250. For secure transmissions, the packet may be conventionally encrypted using a unique key for the particular unicast tunnel 230 being used. The packet may be encapsulated in a unicast tunnel packet at tunnel gateway 220. Conventional tunnels may use an encapsulation protocol such as Internet Protocol Security's Encapsulating Security Payload (IPsec ESP). IPsec may provide a range of tunneling security features. IPsec, alone or with other protocols, such as Internet Key Exchange (IKE), may build unique sets of security associations for each tunnel including access controls, encryption keys, and authentication keys for a given tunnel. As a result, both the data and the final destination of the packet cannot be deciphered once the data enters the tunnel 230. Tunnel endpoint 250 may decrypt received packets based on the decryption key and perform authentication check for a given tunnel and may then forward the original packet toward the packet's final destination, i.e., destination device 270.

SUMMARY OF THE INVENTION

In one aspect consistent with principles of the invention, a method is provided for enabling secure multicast transmission through a network. The method may include receiving a first join request from a first downstream router via a first tunnel established between a forwarding router and the first downstream router, the join request indicating a multicast group to be joined; transmitting group keys to the first downstream router via the first tunnel, wherein the group keys are based on at least the multicast group; cryptographically processing a first packet using the group keys to generate an encapsulated payload; appending a first header to the encapsulated payload to form a first encapsulated packet; establishing a second tunnel with the first downstream router based on the appended first header; and transmitting the first encapsulated packet through the first group keying tunnel to the first downstream router.

In a second aspect consistent with principles of the invention, a method for receiving a multicast transmission through a network is provided. The method may include transmitting a join request to a forwarding router via a unicast tunnel established between the forwarding router and a first downstream router, the join request indicating a multicast group to be joined; receiving group keys in response to the transmitted join request, the group keys based at least on the multicast group; establishing a group keying tunnel between the forwarding router and the first downstream router; receiving an encapsulated packet via the group keying tunnel; cryptographically processing the encapsulated packet using the group keys to reveal a multicast packet including an Internet Protocol (IP) header having a multicast destination address; forwarding the multicast packet on an interface toward at least one multicast recipient corresponding to the multicast destination address.

In a third aspect consistent with principles of the invention, a device for receiving and transmitting packets within a computer network is provided. The device may be configured to receive a first join request from a first downstream router via a first tunnel established between the first downstream router and a forwarding router, the first join request indicating a multicast group to be joined; transmit group keys based on at least the multicast group to the first downstream router via the first tunnel; cryptographically process a first packet using the group keys to generate an encapsulated payload; append a first header to the encapsulated payload to form a first encapsulated packet, wherein the first header includes information associated with the first downstream router; establish a second tunnel with the first downstream router based on the appended first header; and transmit the first encapsulated packet through the second tunnel to the first downstream router.

In a fourth aspect consistent with principles of the invention, a device for receiving and transmitting packets within a computer network is provided. The device may be configured to receive a first join request from a first downstream router via a first unicast tunnel established between the first downstream router and a forwarding router; receive a second join request from a second downstream router via a second unicast tunnel established between the second downstream router and the forwarding router, wherein the first and second join request indicate a multicast group to be joined; generate group keys based at least on the multicast group; transmit the group keys to the first downstream router via the first unicast tunnel; transmit the group keys to the second downstream router via the second unicast tunnel; cryptographically process a first multicast packet using the group keys to generate an encapsulated payload; append a first unicast Internet Protocol (IP) header to the encapsulated payload to form a first encapsulated packet, wherein the first unicast IP header is associated with the first downstream router; establish a first group keying tunnel with the first downstream router based on the appended first unicast IP header; copy the encapsulated payload; append a second unicast Internet Protocol (IP) header to the copied encapsulated payload to form a second encapsulated packet, wherein the second unicast IP header is associated with the second downstream router; establish a second group keying tunnel with the second downstream router based on the appended second unicast IP header; transmit the first encapsulated packet through the first group keying tunnel to the first downstream router; and transmit the second encapsulated packet through the second group keying tunnel to the second downstream router.

BRIEF DESCRIPTION OF DRAWINGS

The accompanying drawings, which are incorporated in and constitute a part of this specification, illustrate an implementation of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Figure 1:
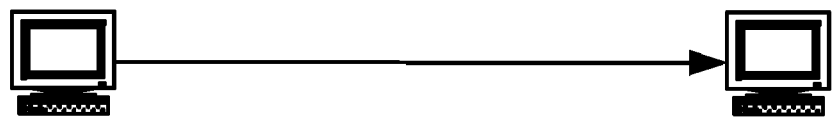
FIG. 1 is an illustration of network transmission modalities.
Figure 1:
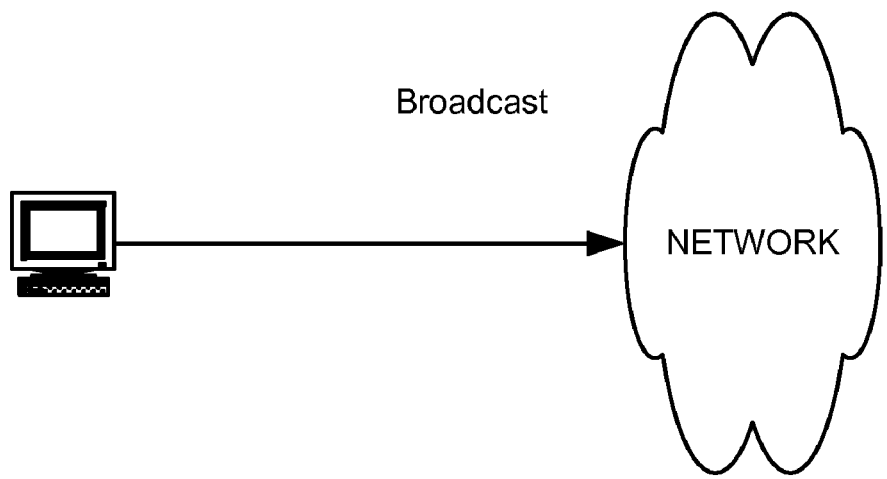
Figure 1:
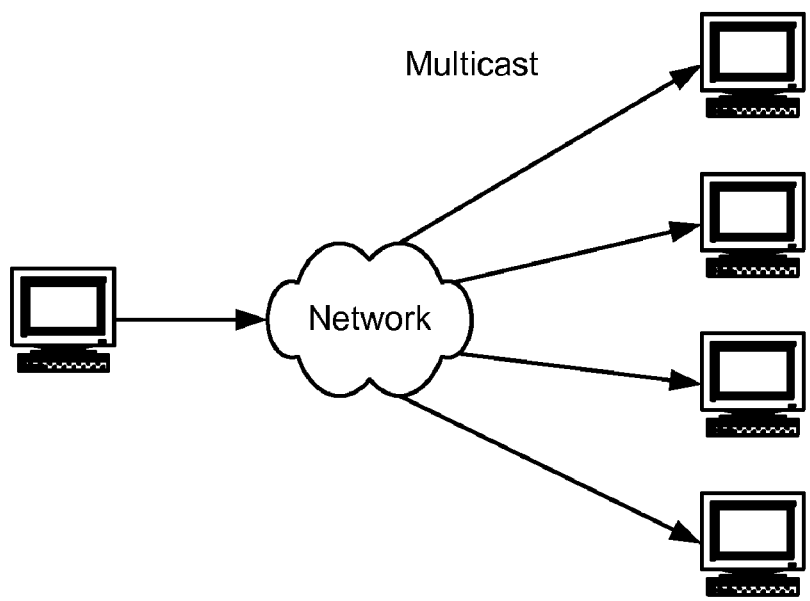
Figure 2:
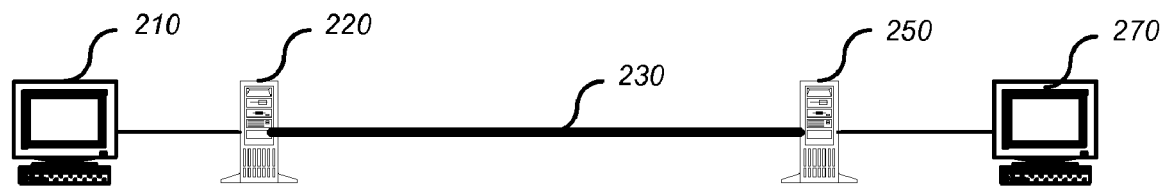
FIG. 2 is schematic illustration of an exemplary network communication using a tunnel.
Figure 3:
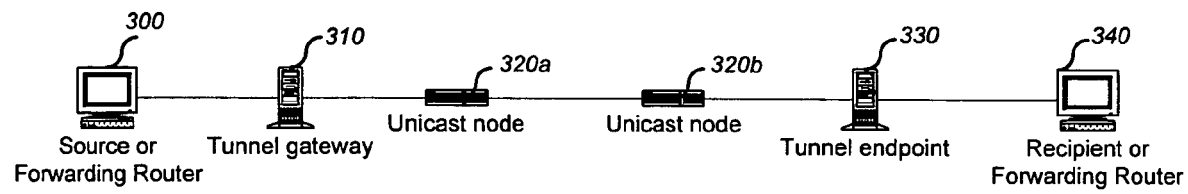
FIG. 3 is schematic illustration of an exemplary multicast data transmission through a tunnel.

FIG. 3 is schematic illustration of an exemplary multicast data transmission through a tunnel. As shown in FIG. 3, multicast data transmission using tunnels may begin with a multicast source 300. Multicast source 300 may transmit multicast data to tunnel gateway 310 in the form of multicast packets. A multicast packet may include both a multicast data payload and an IP header. The multicast data payload may be a piece of data from a multicast stream requested by a recipient downstream of tunnel gateway 310. The Internet Protocol (IP) header may provide information including network addresses of multicast source 300 and a multicast group address subscribed to by recipient 340. The network addresses may be, for example, IP addresses. The multicast stream may be defined as a group of packets that make up the data being multicast out for a particular source and group (notated as (S,G)).

The multicast stream may only be directly transmitted over a multicast-enabled network. Routers and other intermediate network nodes in a non-enabled network may not forward data packets containing a multicast header because the non-enabled devices may not read the multicast recipient address and therefore may not know where to forward the multicast packet. In order to transmit multicast data over a non-enabled network, source 300 may transmit multicast packets through a unicast tunnel, beginning with a tunnel gateway 310 and ending with a tunnel endpoint 330. FIG. 3 illustrates an exemplary path involving only one tunnel to provide clarity of the transmission path between multicast source 300 and multicast recipient 340. Multiple tunnels may be used and are discussed below with respect to FIG. 4. A multicast packet may be translated into an encapsulated packet for transport through a unicast tunnel at tunnel gateway 310. Tunnel gateway 310 may encrypt and authenticate a multicast packet and may then encapsulate the encrypted and authenticated packet in an encapsulated packet. The encapsulation may include attaching a header that includes the source and endpoint unicast address for the tunnel (e.g., a source and destination IP address in an IP tunnel). The IP header and the nature of the data packet may then be invisible to the network. Tunnel gateway 310 may then transmit a multicast packet through a non-multicast enabled network as an encapsulated packet to tunnel endpoint 330.

Following transmission by tunnel gateway 310, the encapsulated packet may encounter a number of intermediary node devices along the tunnel path to tunnel endpoint 330 including, for example, routers 320a and 320b ("routers 320") (e.g., a unicast node). Routers 320 may operate to forward packets along a particular path to the next destination, or hop, whether it be another router or the final destination. Routers 320 may examine the unicast tunnel header attached to the tunnel packet to determine the destination address for the tunneled packet. A routing table within each of routers 320 may be used by routers 320 to determine which path to forward a packet having a particular multicast group address. Using the routing table, routers 320 may determine the correct path for the tunnel packet and may forward the tunnel packet accordingly. The path between tunnel gateway 310 and tunnel endpoint 330 may traverse a number of intermediary nodes, with each intermediary node similarly forwarding the tunnel packet until it arrives at tunnel endpoint 330. If not encapsulated with a unicast header, but instead left with the IP header, a non-multicast enabled node device may not recognize the multicast group address and consequently may not be able to route the packet to a next destination, resulting in a dropped packet.

Tunnel endpoint 330 may receive the encapsulated packet. Tunnel endpoint 330 may remove the encapsulation from the encapsulated packet and may decrypt and authenticate the resulting packet. The decryption and authentication process produces the original multicast packet having an IP header and a multicast data payload. Tunnel endpoint 330 may forward the multicast packet toward other multicast recipients 340 and additional downstream routers based on a destination found in the IP header, such as the multicast group address.

Figure 4:
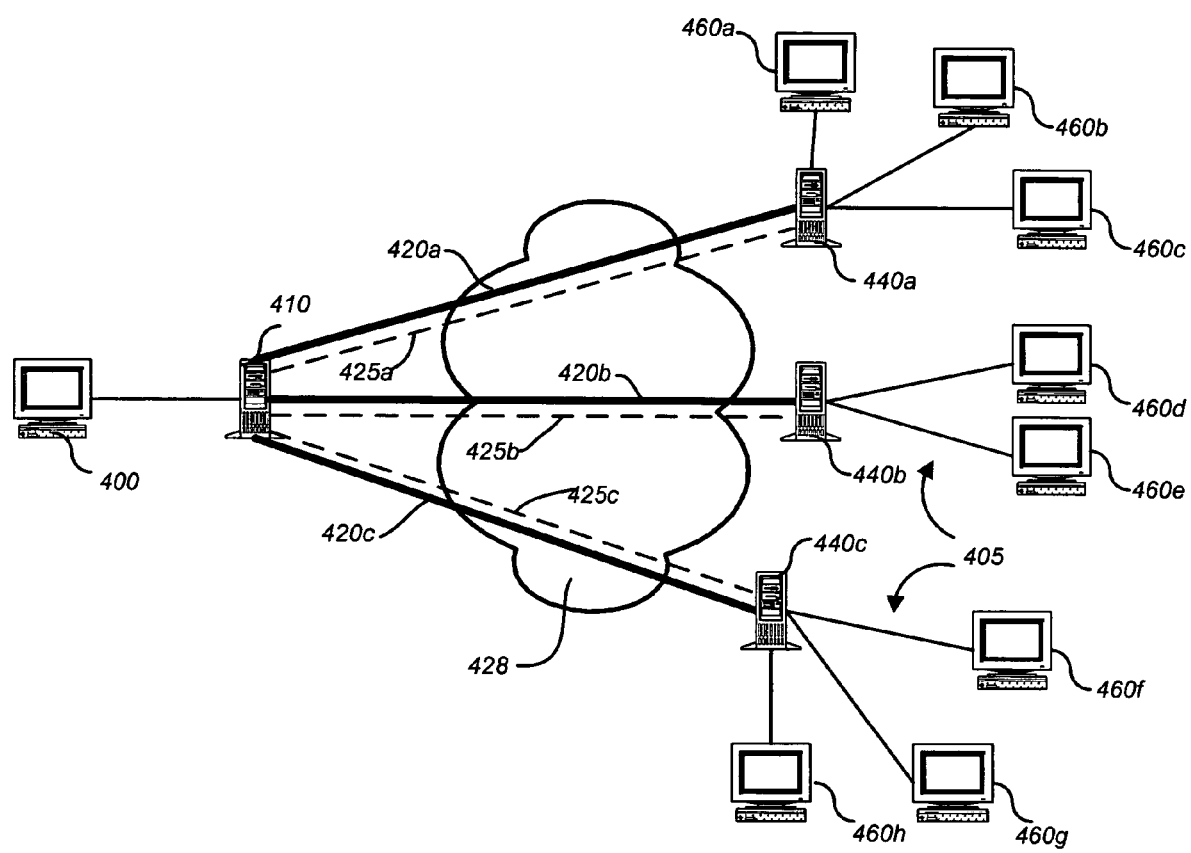
FIG. 4 is a schematic illustration of an exemplary multicast data transmission over multiple tunnels.

Referring now to FIG. 4, an exemplary multicast system using multiple tunnels is illustrated. A multicast source 400 may transmit a copy of each multicast packet to a forwarding router 410 for each multicast group. Although shown connected for purposes of simplicity, it should be understood that multicast source 400 and forwarding 410 may be operatively connected in any suitable manner, with additional intermediary devices (e.g., routers, etc.) potentially positioned therebetween. Additionally, as defined herein, a multicast group relates to a defined multicast group address on which a group of multicast recipients 460a-460h ("multicast recipients 460") continually look for the multicast stream. Multicast recipients 460 located within a multicast network may be connected to the multicast stream via one of group keying tunnels 420a-420c (collectively, "group keying tunnels 420") as well as one of pre-existing unicast tunnels 425a-425c ("pre-existing unicast tunnels 425"). In the present implementation, each of tunnels 420 relates to the same multicast group and therefore provides multicast packets encrypted, authenticated, and encapsulated using the same set of group keys, yet having differing IP destination headers. It should be understood that additional sets of unicast tunnels may be used for different multicast streams. Group keying tunnels 420 and pre-existing unicast tunnels 425 may be established for each multicast stream and for each pairing of forwarding router 410 and downstream router 440 through a unicast network 428 (e.g., the Internet, a local area network (LAN), etc.). Forwarding router 410 may be a compatible router, a network server, a computer, or some other tunnel compatible network interface including a component within a multicast source 400.

In accordance with principles of the invention, a join request may be received from one of multicast recipients 460 via an associated one of downstream routers 440 through an associated one of pre-existing unicast tunnels 425 indicating participation in a group keying encryption scheme. Forwarding router 410 may then generate associated group keys and exchange the keys with the requesting one of downstream routers 440 again via the associated one of pre-existing unicast tunnels 425. The forwarding router 410 may then encrypt and authenticate the original multicast packet, using the group keys, and encapsulate the multicast packet, as described with respect to FIG. 3 above, to form encapsulated packets from each multicast packet. Additional details regarding the received join request, encryption, authentication, and encapsulation will be set forth in additional detail below.

Forwarding router 410 may also attach an IP header to each encapsulated packet and direct each encapsulated packet through the appropriate group keying tunnel 420 toward each requesting downstream router 440. The processing associated with encrypting, authenticating, and encapsulating the multicast packets may be collectively referred to as tunneling encapsulation processing and may include any techniques necessary to prepare the multicast packets for forwarding to downstream routers 440 via tunnels 420.

Additionally, it should be understood that the number of tunnels shown is illustrative only. Any number of tunnels may exist depending on the number of downstream routers, seeking multicast group data and the number of multicast groups (S,G) or (*,G) these downstream routers wish to join. The terminology (S,G) refers to a manner of identifying multicast groups by a source S and an group address G. For (*,G) groups, multiple sources may be generating the original multicast packets. The encapsulated packet may be transmitted through the appropriate one of group tunnels 420 corresponding to the unicast header to a downstream router 440a-440c ("downstream routers 440"). For example, downstream routers 440 on the multicast recipient end may be compatible routers, network servers, one of multicast recipients 460, or some other tunnel compatible network interface. Further, if any of downstream routers 440 is a network server, the network between the network server serving as a downstream router and the multicast recipient should be multicast enabled so that the multicast packet may be transmitted to multicast recipient 460 from downstream router 440. Otherwise, the method described above as occurring between forwarding router 410 and one of downstream routers 440 would occur again in a similar fashion between the downstream router 440 and additional routers downstream of routers 440 (not shown).

Upon reaching one of downstream routers 440, each encapsulated packet may be de-encapsulated, decrypted and authenticated. The resulting multicast packet may then be routed by the downstream router 440 toward multicast recipients 460 in a known manner.

Figure 5:
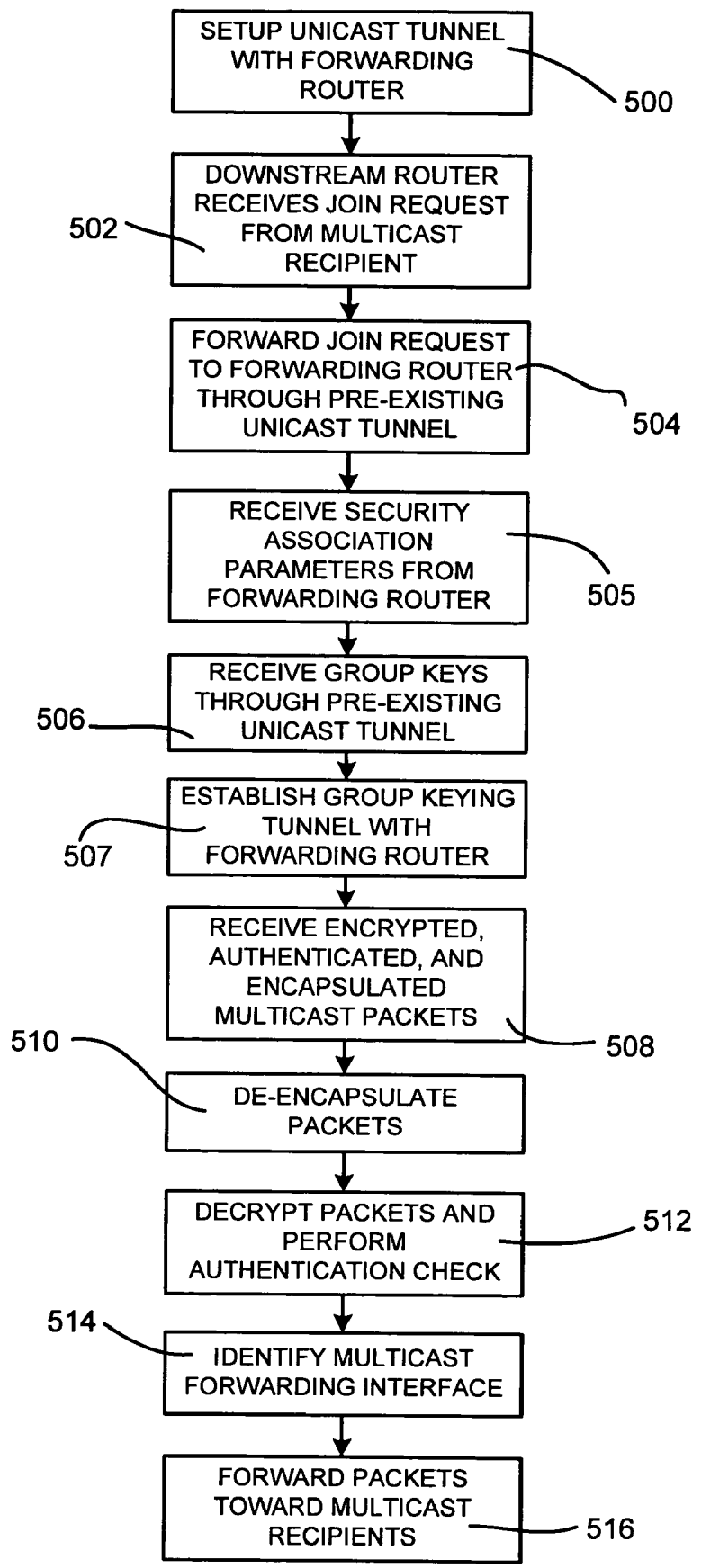
FIG. 5 is a flowchart illustrating an exemplary process of receiving a tunnel packet and decrypting the tunnel packet into a multicast packet.

FIG. 5 is a flow diagram illustrating one exemplary process for receiving multicast packets through a network in accordance with principles of the invention. In this exemplary implementation, a multicast packet is transmitted from multicast source 400 to multicast recipient 460d via forwarding router 410, tunnel 420b, and downstream router 440b. This implementation is exemplary only and any suitable combination of network elements may be utilized in accordance with principles of the invention. Processing may begin by downstream router 440b establishing an initial unicast tunnel 425b with forwarding router 410 to facilitate an exchange of unicast packets (act 500). Once tunnel 420b has been established, a join request may be received from multicast recipient 460d (act 502), indicating that recipient 460d would like to subscribe to a particular multicast group and received transmissions relating to that group. The join request may follow any suitable multicast protocol as is known in the art. In one implementation consistent with principles of the invention, the join request may be a Protocol Independent Multicast—Sparse Mode (PIM-SM) join request. Alternatively, an Internet Group Management Protocol (IGMP) join request may be received. Regardless of the protocol used, the received join request should include at least an indication of which multicast group is desired to be joined (e.g., a multicast group address).

Upon receipt of a join request, downstream router 440b forwards the join request to forwarding router 410 through pre-existing unicast tunnel 425b (act 504). As will be discussed in additional detail below, forwarding router 410 generates group encryption and authentication keys (collectively, "group keys") associated with downstream router 440b. Following transmission of the join request, downstream router 440b may then receive security association parameters from forwarding router 410 (act 505). In one implementation consistent with principles of the invention, the security association parameters may include specifics relating to the group keying scheme employed by forwarding router 410, including, but not limited to, key lifetime, cipher used, key length, overlap handling instructions, request messages, acknowledgement messages, status and error messages, rollover protocols, etc. Once the security parameters have been exchanged, the generated keys are then communicated to and received by downstream router 440b via pre-existing unicast tunnel 425b (act 506). Forwarding router 410 then encrypts and authenticates each incoming multicast packet associated with the selected multicast group using the group keys, and encapsulates the resulting payload into an encapsulated packet having a tunnel IP header incorporating source and destination addresses (e.g., forwarding router 410 and downstream router 440*b*) for the encapsulated payload. Next, a group keying tunnel 420*b* is established related to the tunnel IP header source and destination addresses, to accommodate the encapsulated packet (act 507). The encapsulated packets are then transmitted to and received by downstream router 440*b* via group keying tunnel 420*b* (act 508). The received packets are then de-encapsulated, thereby stripping the tunnel IP header and leaving the encrypted and authenticated data payload (act 510). The received packets are then decrypted using the group keys received in act 506, and in accordance with the negotiated security association parameters, to expose the initial multicast packet (act 512). Downstream router 440*b* may then analyze the header of the original multicast packet to identify the interface on which multicast recipients are looking for the packet based on the group (destination) addresses in the header (act 514). The de-encapsulated and decrypted packets are then forwarded out toward multicast recipient 460*d* on the identified interface (act 516).

Figure 6:
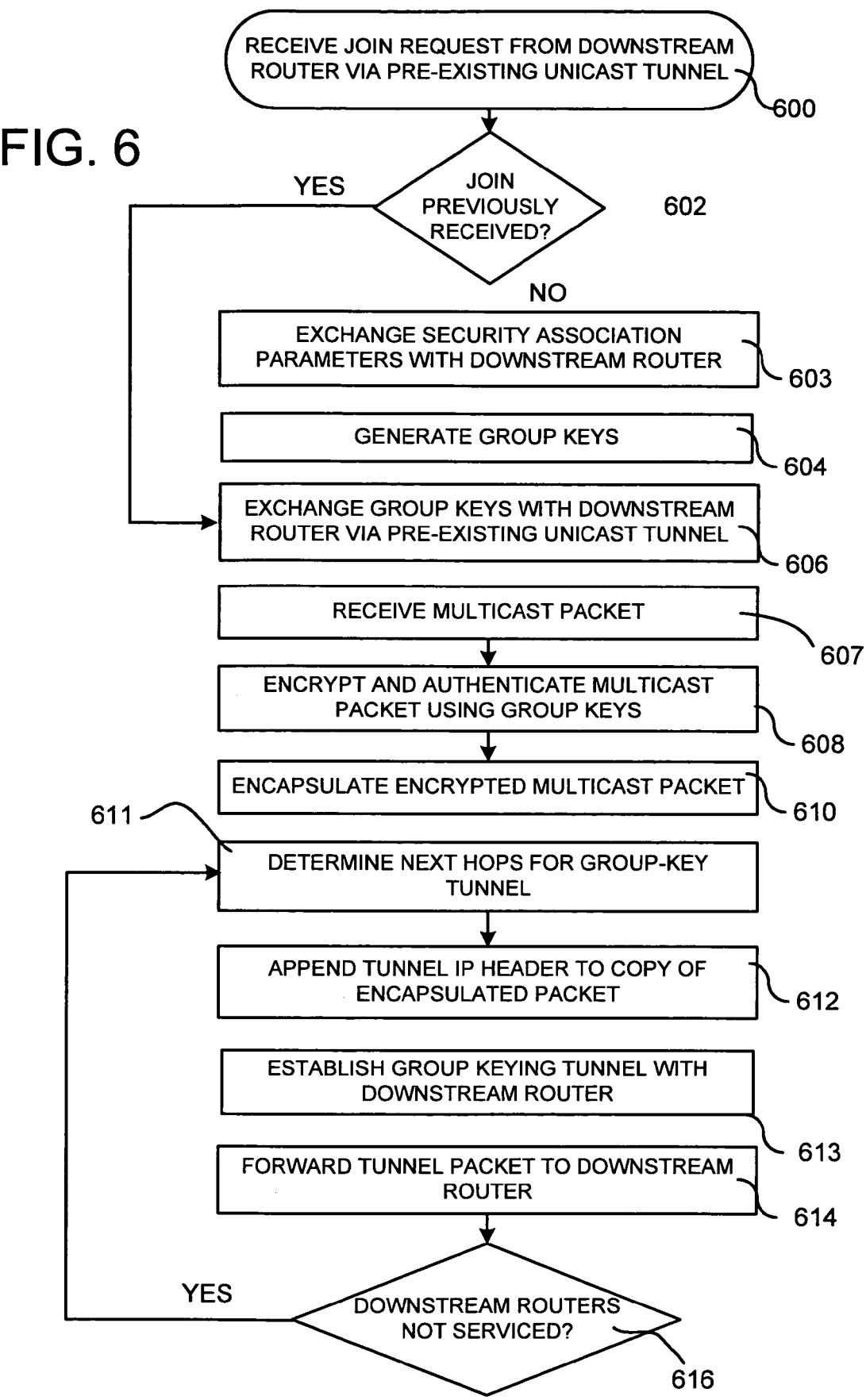
FIG. 6 is a flowchart describing an exemplary method for transmitting multicast packets through tunnels.

FIG. 6 illustrates an exemplary method for secure multicast data transmission between a source and a recipient through tunnels. Initially, as described briefly above, forwarding router 410 receives a join request from downstream router 440*b* via pre-existing unicast tunnel 425*b* (act 600). In response, forwarding router 410 first determines whether a join request has been previously received for the particular multicast group (act 602). If so, the process proceeds to act 606 described below. However, if a join request has not been previously received, forwarding router 410 may exchange security association parameters with downstream router 440*b* (act 603). As described above, the security association parameters may include specifics relating to the group keying scheme employed by forwarding router 410, such as key lifetime, cipher used, key length, rollover protocols, etc. Group encryption and authentication keys are generated based at least on the multicast group (act 604). Group keys of this form may be represented by the phrase $K_g^p$, where 'p' represents the type of key and 'g' represents the multicast group. Accordingly, one exemplary set of group keys may be $K_{239.1.1.1}^a$ as the authentication key and $K_{239.1.1.1}^e$ as the encryption key, where 239.1.1.1 is the IP address for the desired multicast group. In an alternative implementation consistent with principles of the invention, the group keys may be further based on the addressing information associated with forwarding router 410. In this implementation, the group keys may be represented as $K_{5.5.5.1,239.1.1.1}^a$ for authentication and $K_{5.5.5.1,239.1.1.1}^e$ for encryption, where 5.5.5.1 is the IP address for forwarding router 410.

Once generated, the groups keys may be forwarded to downstream router 440*b* via pre-existing unicast tunnel 425*b* to enable subsequent decryption and authentication of received multicast packets (act 606). Upon receipt of a multicast packet associated with the selected multicast group (e.g., having a destination IP address of 239.1.1.1) from multicast source 400 (act 606), forwarding router 410 initially encrypts and authenticates the packet header and payload information using the group keys generated in act 604 to generate an encrypted and authenticated multicast packet (act 608). Next, the encrypted and authenticated multicast packet is encapsulated to form an encapsulated payload for an encapsulated packet (act 610). In one implementation, the payload may be an Encapsulating Security Payload (ESP), as defined in RFC 2406 published by the IETF (Internet Engineering Task Force).

The next hop for the group keying tunnel is then determined (act 611). More specifically, the destination address of the next downstream router or routers to receive the packet is identified. A tunnel IP header may then be appended to the encapsulated payload to form the encapsulated packet (act 612). In one implementation consistent with principles of the invention, the tunnel IP header includes source and destination addresses associated with forwarding router 410 and downstream router 440*b*, respectively, as identified in act 611. In accordance with these addresses, a group keying tunnel 420*b* may then be established between forwarding router 410 and downstream router 440*b* to facilitate exchange of multicast packets (act 613).

In this manner, only one encapsulation is required for each multicast group, regardless of the number of multicast recipients subscribing to the multicast group. Accordingly, the only distinction between encapsulated packets destined for different downstream routers 440 is the tunnel IP header appended. Upon encapsulation, the received multicast packet is forwarded through group keying tunnel 420*b* to downstream router 440*b* (act 614). It is next determined whether any downstream routers have not yet been serviced (act 616). If so, the process returns to act 611, where the appropriate next hop is determined. If not, the process ends, as the multicast packet has been router to all requesting downstream routers.

Figure 7:
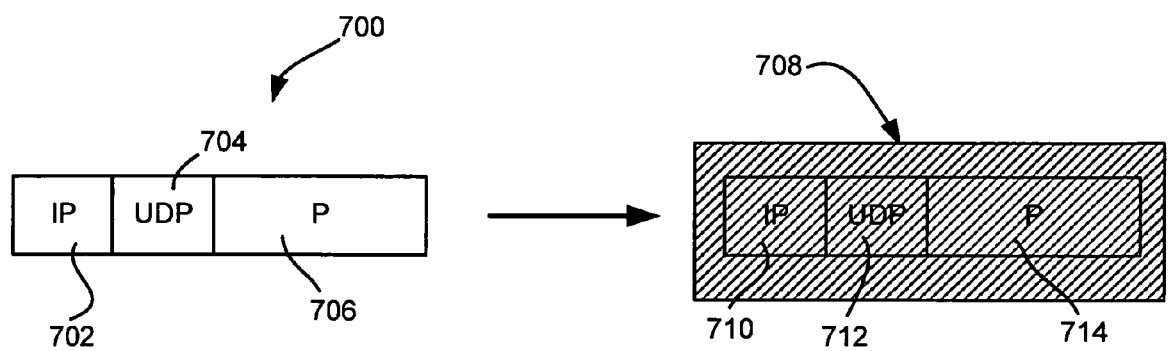
FIG. 7 is a schematic diagram illustrating an exemplary implementation of an encryption and authentication scheme consistent with principles of the invention.

FIG. 7 is a schematic diagram illustrating one exemplary implementation of an encryption scheme consistent with principles of the invention. As shown in FIG. 7, a multicast packet 700 received by forwarding router 410 may include a UDP (user datagram protocol) header (UDP) 702, an IP header (IP) 704, and a payload (P) 706. Upon encryption by forwarding router 410, an encrypted multicast packet 708 may be generated incorporating multicast packet 700.

Figure 8:
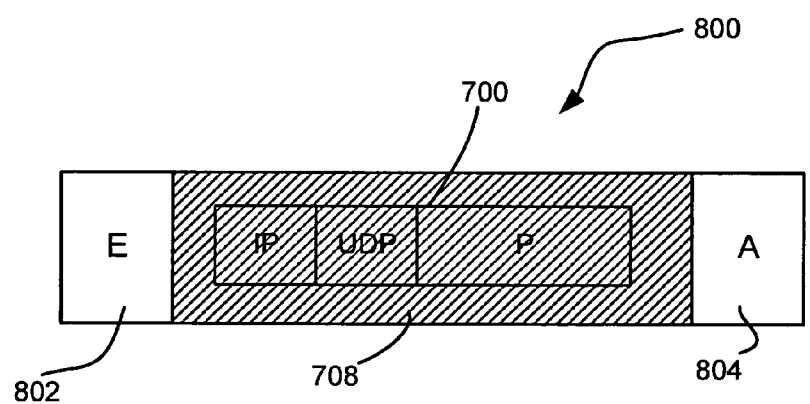
FIG. 8 is a schematic diagram illustrating an exemplary implementation of an encapsulation scheme consistent with principles of the invention.

FIG. 8 is a schematic diagram illustrating one exemplary implementation of an encapsulation scheme consistent with principles of the invention. As shown in FIG. 8, encapsulation consistent with principles of the invention may generate an encapsulated payload 800 incorporating encrypted multicast packet 708 described in FIG. 7, an ESP header 802 to facilitate de-encapsulation, and an authentication trailer 804 to facilitate authentication of the received packet.

Figure 9:
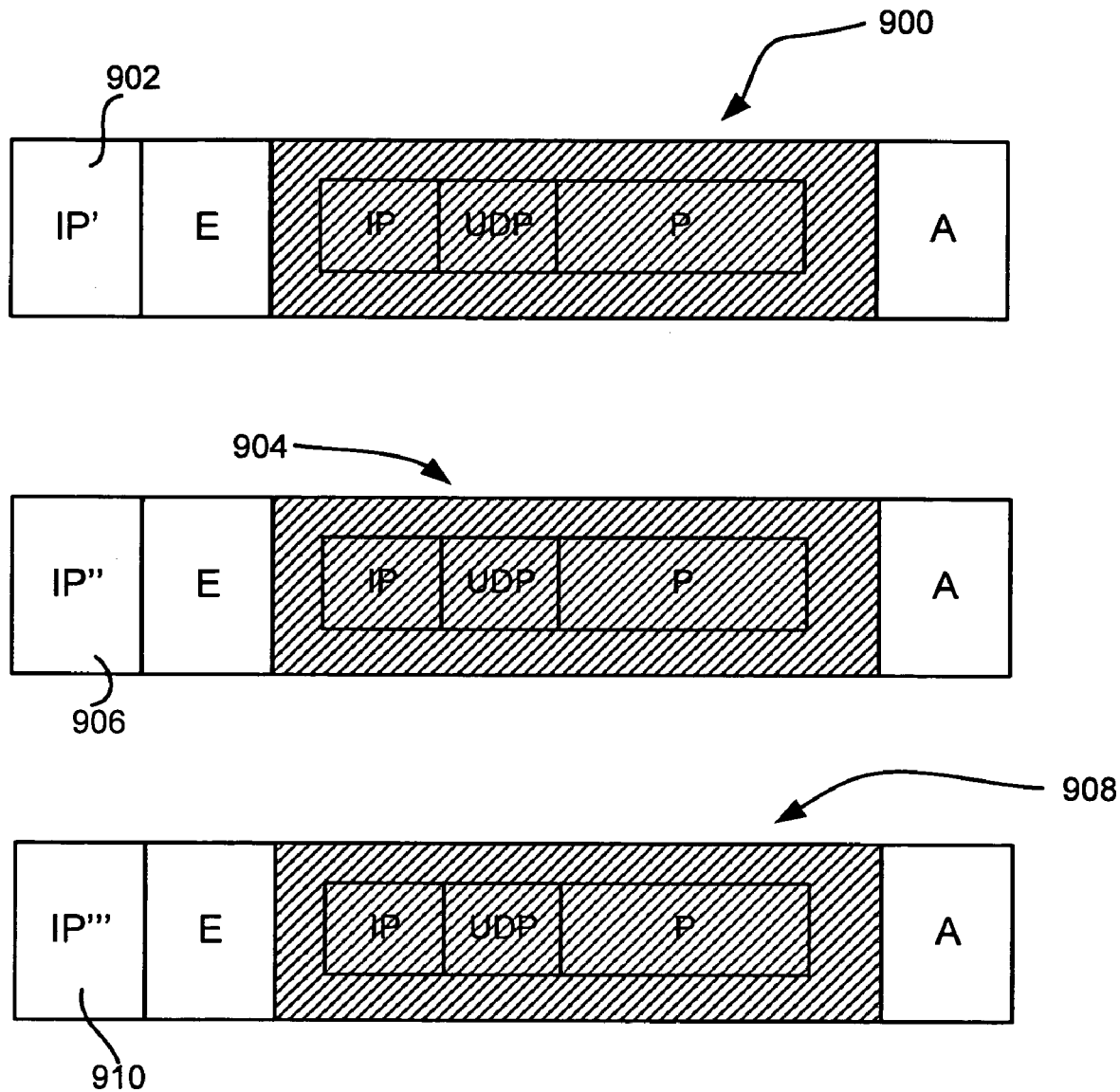
FIG. 9 is a schematic diagram illustrating another exemplary implementation of an encapsulation scheme consistent with principles of the invention.

FIG. 9 is a schematic diagram illustrating several exemplary implementations of encapsulated packets consistent with principles of the invention. More specifically, a first encapsulated packet 900 is illustrated that includes the encapsulated payload 800 of FIG. 8 as well as an IP header (IP') 902 associated with a first downstream router 440*a*. Additionally, a second encapsulated packet 904 is illustrated that also includes the encapsulated payload 800 of FIG. 8 as well as a second IP header (IP'') 906 associated with second downstream router 440*b*. A third encapsulated packet 908 is illustrated that also includes the encapsulated payload 800 of FIG. 8 as well as a third IP header (IP''') 910 associated with a third downstream router 440*c*. As shown, using the group keying and encapsulation scheme consistent with principles of the invention, encryption, authentication, and encapsulation need only be performed once for each multicast packet, with downstream router designation being accommodated by distinct IP headers appended to the encapsulated packet, thereby substantially reducing processing overhead for the multicast process.

Figure 10:
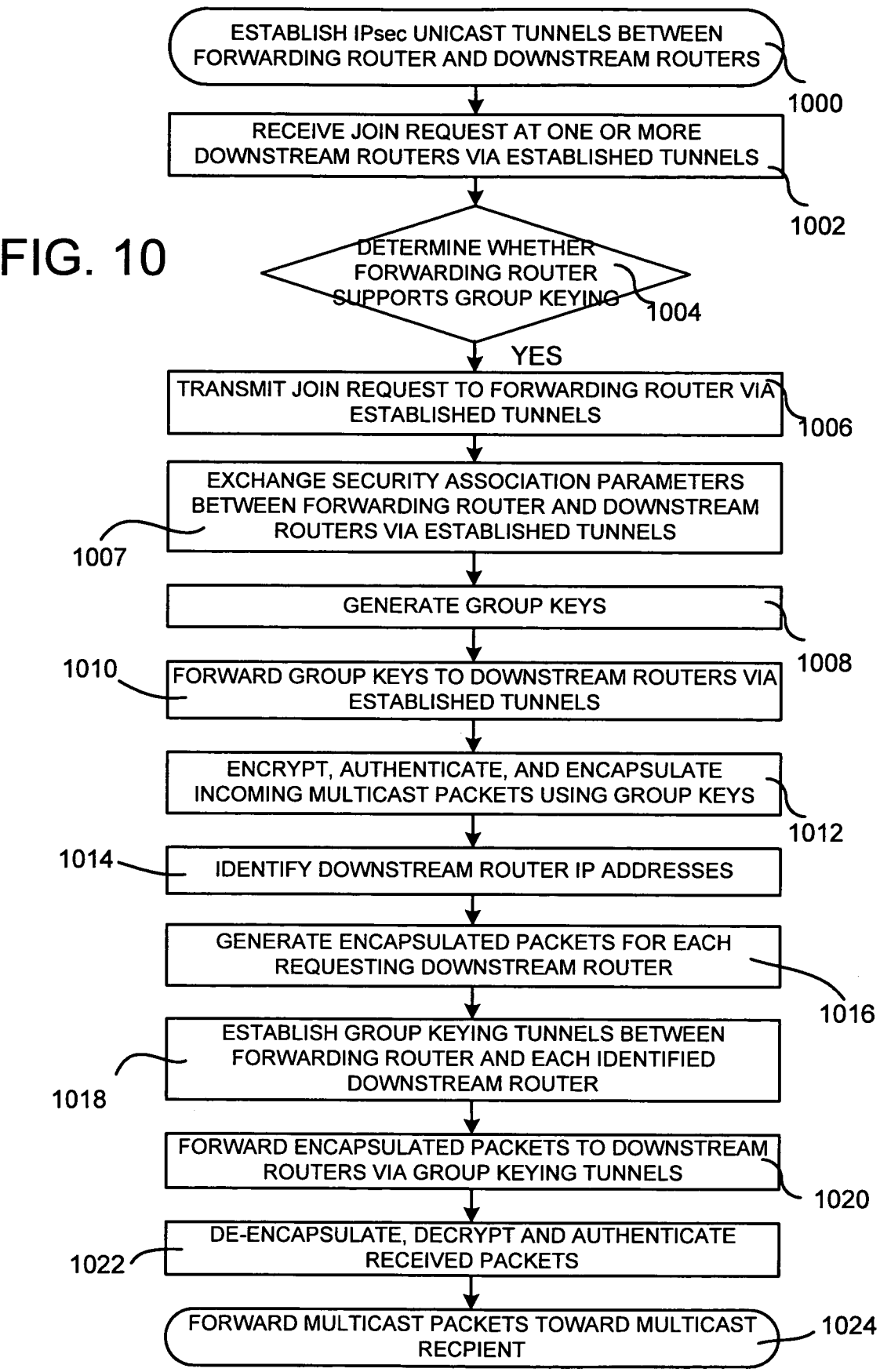
FIG. 10 is a flowchart describing an exemplary method of multicast data transmission through tunnels.

One exemplary implementation of the multicast data transmission process through an IP network environment is described in FIG. 10. Initially, a first set of IPsec unicast tunnels 425 may be created between forwarding router 410 and each downstream router 440 (act 1000). IPsec may provide a range of tunneling security features including the building of security associations for tunnels. The tunnel security associations may include access controls, encryption keys, and authentication keys for the tunnel.

After the establishment of IPsec tunnels 425 from forwarding router 410 to downstream routers 440, one or more of the downstream routers 440 may receive a join request from a multicast recipient 460 to join a specific multicast group having a defined address (act 1002). In response, the receiving downstream routers 440 may determine whether forwarding router 410 supports a group key encryption/authentication scheme (act 1004). In one implementation, downstream routers 440 maintain a table indicating participation in the group key encryption scheme based on (S,G) or (*,G) of the multicast groups. Consultation of this table may enable downstream routers 440 to determined forwarding router 410's participation and ability to perform the group key tunneling function. If it is determined that forwarding router 410 supports group key encryption, a join request may then be transmitted to forwarding router 410 indicating group key participation via associated ones of tunnels 425 (act 1006).

Upon receipt of the join request, forwarding router 410 exchanges security parameters with the requesting downstream routers 440 via tunnels 425 (act 1007) and generates group keys for authentication and encryption in the manner set forth above with respect to FIG. 6 (act 1008). In an alternative implementation consistent with principles of the invention, additional downstream routers may have already signaled for the multicast group, therefore previously triggering group key generation by forwarding router 410. In either case, the group keys are then forwarded to the requesting downstream routers 440 via tunnels 425 for use in decrypting and authenticating received encapsulated packets (act 1010). Next, incoming multicast packets are encrypted, authenticated, and encapsulated using the group keys generated in act 1008 to generate encapsulated payloads (act 1012).

Next, forwarding router 410 identifies IP addresses associated with each requesting downstream router 440 (act 1014), and generates encapsulated packets for each identified downstream router 440 (act 1016), where the individual encapsulated packets include a copy of the encapsulated payload generated in act 1012 and a unique IP header including a destination IP address associated with the respective downstream routers 440. Additionally, following identification of the requesting downstream routers 440, group keying IPsec tunnels 420 may then be established to facilitate the exchange of the encapsulated packets between forwarding router 410 and downstream routers 440 (act 1018). The encapsulated packets are then forwarded via tunnels 420 to downstream routers 440 as identified in the tunnel IP headers of each encapsulated packet (act 1020).

Once received by downstream routers 440, the encapsulated packets are de-encapsulated, decrypted, and authenticated or otherwise cryptographically processed using the group keys received in act 1010 to generate the original multicast packets (act 1022). The multicast packets are then forwarded towards multicast recipients 460 via appropriate interfaces according to the multicast destination addresses of the multicast packets (act 1024). By enabling multicast packets to be encrypted and encapsulated using group keys associated with individual IPSec tunnels, it becomes unnecessary to cryptographically process multicast packets individually for each recipient.

The order of the above steps may be changed without affecting the result. For example, the group keys may be distributed after the creation of any specific encapsulated payloads using those keys in the security association for the group tunnels with the security associations generated for each of group tunnels 420 having the same key. Additionally, if the requests have been received so that the multicast recipients are known, groups can be defined and group tunnels 420 formed without first generating individual tunnels between multicast source 400 and each multicast recipient 460.

Embodiments may be implemented in digital electronic circuitry, computer hardware, firmware, or software, or in combinations thereof. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program may be deployed for execution on one computer or on multiple computers at one site or distributed across multiple sites interconnected by a communication network.

Method acts of embodiments may be performed by one or more programmable processors executing a computer program to perform functions consistent with the principles of the invention by operating on input data and generating output. Method acts may also be performed by, an apparatus consistent with the principles of the invention implemented as, special purpose logic circuitry, e.g., an FPGA (field programmable gate array) or an ASIC (application-specific integrated circuit).

Processors suitable for the execution of a computer program may include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer may also include, or may be operatively coupled to receive data from or transfer data to, or both, one or more mass storage devices for storing data, for example, magnetic, magneto-optical disks, or optical disks. Information carriers suitable for embodying computer program instructions and data may include all forms of nonvolatile memory, including, by way of example, semiconductor memory devices, e.g., EPROM, EEPROM, and flash memory devices, magnetic disks, e.g., internal hard disks or removable disks, magneto-optical disks, CD-ROM and DVD-ROM disks. The processor and the memory may be supplemented by, or incorporated in special purpose logic circuitry.

Embodiments consistent with the principles of the invention may be implemented in a computing system that may include a back-end component, e.g., as a data server, or that may include a middleware component, e.g., an application server, or that may include a front-end component, e.g., a client computer having a graphical user interface or a Web browser through which a user may interact with an implementation of the invention, or any combination of such back-end, middleware, or front-end components. The components of the system may be interconnected by any form or medium of digital data communication, e.g., a communication network. Examples of communication networks may include a local area network ("LAN") and a wide area network ("WAN"), e.g., the Internet.

The computing system may include clients and servers. A client and server are generally remote from each other and typically may interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention.

What is claimed is:

1. A method of providing secure multicast transmission through a network, comprising:
   receiving a first join request from a first downstream router, the join request indicating a multicast group to be joined, where receiving the first join request from the first downstream router comprises receiving the first join request from the first downstream router via a pre-existing tunnel established between a forwarding router and the first downstream router;
   transmitting group keys to the first downstream router the group keys are based on at least the multicast group, where transmitting the group keys to the first downstream router comprises transmitting the group keys to the first downstream router via the pre-existing tunnel;
   cryptographically processing a first packet using the group keys to generate an encapsulated payload;
   appending a first header to the encapsulated payload to form a first encapsulated packet;
   establishing a second tunnel with the first downstream router based on the appended first header; and
   transmitting the first encapsulated packet through the second tunnel to the first downstream router.

2. The method of claim 1, comprising:
   exchanging security association parameters with the first downstream router via the pre-existing tunnel in response to the received first join request.

3. The method of claim 2, where the security association parameters include at least one of: group key lifetime, cipher used, key length, overlap handling instructions, request messages, acknowledgement messages, status and error messages, or rollover protocols.

4. The method of claim 1, further comprising:
   determining, in response to the received first join request, whether the group keys had been previously generated for the multicast group; and
   generating the group keys based at least on the multicast group if the group keys had not been previously generated for the multicast group.

5. The method of claim 1, where the group keys are further based on an address of the multicast source and an address of the multicast group.

6. The method of claim 1, where the first downstream router is operatively connected to at least one multicast recipient.

7. The method of claim 1, where the group keys include a group encryption key and a group authentication key.

8. The method of claim 1, where cryptographically processing includes encrypting the packet using the group keys.

9. The method of claim 1, where cryptographically processing includes authenticating the packet using the group keys.

10. The method of claim 1, where cryptographically processing includes encapsulating the packet.

11. The method of claim 10, where encapsulating the packet includes generating an encapsulating security payload (ESP) incorporating the packet.

12. The method of claim 1, where the first header includes a source Internet Protocol (IP) address associated with a forwarding router and a destination IP address associated with the first downstream router.

13. The method of claim 1, where the second tunnel is a unicast tunnel.

14. The method of claim 13, where the second tunnel is an Internet Protocol Security (IPsec) tunnel.

15. The method of claim 1, comprising:
   receiving a second join request from a second downstream router; transmitting the group keys to the second downstream router;
   copying the encapsulated payload;
   appending a second header to the copied encapsulated payload to form a second encapsulated packet;
   establishing a third tunnel with the second downstream router based on the appended second header; and
   transmitting the second encapsulated packet through the third tunnel to the second downstream router.

16. The method of claim 15, where the second header includes a source Internet Protocol (IP) address associated with a forwarding router and a second destination IP address associated with the second downstream router.

17. A device for receiving and transmitting packets within a network, the device comprising:
   hardware configured to:
   receive a first join request from a first downstream router, the first join request indicating a multicast group to be joined, where receiving the first join request from the first downstream router comprises receiving the first join request from the first downstream router via a pre-existing tunnel established between a forwarding router and the first downstream router;
   transmit group keys based on at least the multicast group to the first downstream router via the pre-existing tunnel;
   cryptographically process a first packet using the group keys to generate an encapsulated payload;
   append a first header to the encapsulated payload to form a first encapsulated packet, where the first header includes information associated with the first downstream router;
   establish a second tunnel with the first downstream router based on the appended first header; and
   transmit the first encapsulated packet through the second tunnel to the first downstream router.

18. The device of claim 17, where the tunnel includes an Internet Protocol Security (IPsec) tunnel.

19. The device of claim 17, where the device is further configured to:
   exchange security association parameters with the first downstream router in response to the received first join request.

20. A system for receiving and transmitting packets within a network, comprising:
   a hardware device further comprising:
   means for receiving a join request from a second tunnel endpoint, the join request indicating a multicast group to be joined, where the means for receiving the join request from the second tunnel endpoint comprises means for receiving the join request from the second tunnel endpoint via a pre-existing tunnel established between a first tunnel endpoint and the second tunnel endpoint;
   means for transmitting group keys based on at least the multicast group to the second tunnel endpoint via the pre-existing tunnel;
   means for cryptographically processing a first packet using the group keys to generate an encapsulated payload;

means for appending a header to the encapsulated payload to form an encapsulated packet, where the header includes information associated with the second tunnel endpoint;
means for establishing a second tunnel between the first tunnel endpoint and the second tunnel endpoint based on the appended header; and
means for transmitting the encapsulated packet through the second tunnel to the second tunnel endpoint.

21. The system of claim 20, where the device further comprises:
means for exchanging security parameters between the second tunnel endpoint and the first tunnel endpoint in response to the received join request.

\* \* \* \* \*